United States Patent
Zhou et al.

(10) Patent No.: US 12,118,931 B1
(45) Date of Patent: Oct. 15, 2024

(54) METHOD AND DEVICE FOR REMOVING AFTERIMAGE, AND DISPLAY PANEL

(71) Applicant: HKC CORPORATION LIMITED, Shenzhen (CN)

(72) Inventors: Mancheng Zhou, Shenzhen (CN); Haijiang Yuan, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/647,452

(22) Filed: Apr. 26, 2024

(30) Foreign Application Priority Data

Apr. 27, 2023 (CN) .......................... 202310467860.5

(51) Int. Cl.
*G09G 3/3208* (2016.01)
*G06T 7/90* (2017.01)
*G09G 3/00* (2006.01)

(52) U.S. Cl.
CPC ............ *G09G 3/3208* (2013.01); *G06T 7/90* (2017.01); *G09G 3/006* (2013.01); *G06T 2207/10024* (2013.01); *G09G 2320/0242* (2013.01); *G09G 2320/0257* (2013.01)

(58) Field of Classification Search
None
See application file for complete search history.

(56) References Cited

U.S. PATENT DOCUMENTS

| 2016/0217731 A1* | 7/2016 | Joo .................... G09G 3/3208 |
| 2016/0351115 A1* | 12/2016 | Bang .................. G09G 3/3208 |

FOREIGN PATENT DOCUMENTS

| CN | 106023887 A | 10/2016 |
| CN | 108614654 A | 10/2018 |
| CN | 108628564 A | 10/2018 |
| CN | 109147658 A | 1/2019 |
| CN | 111050224 A | 4/2020 |
| CN | 111553905 A | 8/2020 |
| CN | 115641824 A | 1/2023 |
| KR | 20040029759 A | 4/2004 |
| WO | 2022002205 A1 | 1/2022 |

OTHER PUBLICATIONS

Office Action issued on Jun. 6, 2023 in corresponding Chinese Application No. 202310467860.5; 15 pages.
Notice of Granting Invention Patent Rights Jun. 25, 2023 in corresponding Chinese Application No. 202310467860.5; 8 pages.

* cited by examiner

Primary Examiner — Nicholas J Lee
(74) Attorney, Agent, or Firm — Maier & Maier, PLLC (57) ABSTRACT

A method and a device for removing afterimage, and a display panel. The method includes the image displayed on the display panel is first monitored to determine a target area of the image, and the target area is an area where a color does not change in the image; the background color in the target area is determined; the pixel data in the target area is traversed to determine a block in an image displayed in the target area; and finally, the target pixel in the block based on the background color is determined, and the color of the target pixel is switched according to a preset time interval.

17 Claims, 6 Drawing Sheets monitoring an image displayed on a display panel to determine a target area of the image, and the target area is an area where a color does not change in the image; — S10 determining a background color in the target area; — S20 traversing pixel data in the target area to determine a block in an image displayed in the target area; — S30 determining a target pixel in the block based on the background color, and switching a color of the target pixel according to a preset time interval. — S40

FIG. 1 static screen          screen after being switched into Gray

FIG. 4 scanning result of first 90 seconds    scanning result of last 90 seconds

FIG. 13

METHOD AND DEVICE FOR REMOVING AFTERIMAGE, AND DISPLAY PANEL

CROSS REFERENCE TO RELATED APPLICATION

This application claims priority to Chinese Patent Application No. 202310467860.5, filed on Apr. 27, 2023, which is incorporated herein by reference as in case that fully set forth herein.

TECHNICAL FIELD

The present application relates to the field of display technology, and more particularly to a method and a device for removing afterimage, and a display panel.

BACKGROUND

Organic light emitting diode (OLED) technology has the advantages of lower power consumption, faster response speed, wider viewing angle, support for higher resolution display, wide temperature characteristics, and the ability to achieve soft screens and lightweight product updates compared to other types of display technologies; because of this, the OLED technology can be widely applied.

However, when the screen of the OLED display panel displays a static image for a long time in the prior art, and since there may be uneven brightness and darkness throughout the entire image; in this case, if these organic luminescent materials on the screen continue to emit light for too long, the afterimages of the static image will appear on the screen. This afterimages are commonly referred to as afterimages: taking the mobile phone equipped with the OLED display as an example, in practical applications, if a user operates the phone screen for a long time, or, due to the system status bar being inactive for a long time, it is mainly used to display routine information such as battery level, signal, and time. After using the device for a long time, if the phone switches to the entire solid color screen in full screen, it may be possible to vaguely see traces of icon information such as battery level and signal in the position of the status bar, thereby brings a bad experience to the user.

SUMMARY

In view of this, an embodiment of the present application provides a method and a device for removing afterimage, and a display panel, so as to solve the problem that the afterimage is existed in the display panel.

A first aspect of an embodiment of the present application provides a method and for removing afterimage, and the method includes:

monitoring an image displayed on a display panel to determine a target area of the image, and the target area is an area where a color does not change in the image;
determining a background color in the target area;
traversing pixel data in the target area to determine a block in an image displayed in the target area; and
determining a target pixel in the block based on the background color, and switching a color of the target pixel according to a preset time interval.

In an embodiment, the step of determining the target pixel in the block based on the background color, and switching the color of the target pixel according to the preset time interval includes:

determining target colors in the block except for the background color, counting a number of types of the target colors, and determining target pixels having the target colors in the block;
comparing the number of types with a preset number threshold to generate a comparison result; and
switching colors of the target pixels according to the preset time interval according to the comparison result.

In an embodiment, the step of switching colors of the target pixels according to the preset time interval according to the comparison result includes:

switching, if the number of types is less than the preset number threshold, the colors of the target pixels between the target colors and the background color according to the preset time interval.

In an embodiment, the step of switching colors of the target pixels according to the preset time interval according to the comparison result includes:

switching, if the number of types is equal to the preset number threshold, the colors of the target pixels having different colors according to the preset time interval.

In an embodiment, the method further includes:

determining a background pixel having the background color in the target area; and
switching a color of the background pixel between the background color and a preset color according to the preset time interval.

In an embodiment, after the step of comparing the number of types with a preset number threshold to generate the comparison result further includes:

driving, if the number of types of target colors in the block is greater than the preset number threshold, the target pixel to be lighten up with the target color.

In an embodiment, the step of traversing the pixel data in the target area to determine the block in the image displayed in the target area includes:

traversing the pixel data in the target area row by row to determine a candidate area of the block; and
traversing the pixel data in the target area column by column to determine a block in the candidate area.

In an embodiment, in the step of traversing the pixel data in the target area row by row to determine the candidate area of the block includes:

determining an upper boundary of the candidate area of the block when traversing the pixel data in the target area row by row until a first target pixel data with a color being different from the background color is traversed, wherein the upper boundary is a straight line corresponding to a row direction of the first target pixel data; and
determining a lower boundary of the candidate area of the block when colors of a row of all pixel data traversed in the row direction are all the background color;
the step of traversing the pixel data in the target area column by column to determine a block in the candidate area includes:
determining a left boundary of the candidate area of the block when traversing the pixel data in the target area column by column until a second target pixel data with a color being different from the background color is traversed, wherein the left boundary is a straight line corresponding to a column direction of the second target pixel data;
determining a right boundary of the candidate area of the block when colors of a column of all pixel data traversed in the column direction are all the background color; and determining the block of the candidate area according to the upper boundary of the candidate area, the lower boundary of the candidate area, the left boundary of the block, and the right boundary of the block.

A second aspect of an embodiment of the present application provides a device for removing an afterimage, and the device includes:

a monitoring circuit, configured for monitoring an image displayed on a display panel to determine a target area of the image, wherein the target area is an area where a color does not change in the image;

a first determination circuit, configured for determining a background color in the target area;

a second determination circuit, configured for traversing pixel data in the target area to determine a block in an image displayed in the target area; and an afterimage removal circuit, configured for determining a target pixel in the block based on the background color, and switching a color of the target pixel according to a preset time interval.

A third aspect of an embodiment of the present application provides a display panel, which includes a memory, a processor chip, and a computer program stored in the memory and capable of running on the processor chip, wherein the computer program is executed to implement the step described in any of above methods.

In the method provided in the first aspect of the embodiment of the present application, the image displayed on the display panel is first monitored to determine a target area of the image, and the target area is an area where a color does not change in the image; the background color in the target area is determined; the pixel data in the target area is traversed to determine a block in an image displayed in the target area; and finally, the target pixel in the block based on the background color is determined, and the color of the target pixel is switched according to a preset time interval. It can prevent the appearance of afterimages in the display panel, and can also remove afterimages after being appeared in the display panel, the quality of the display panel is improved and the user experience is improved.

It can be understood that the beneficial effects of the second to third aspects mentioned above can be found in the relevant description in the first aspect, which will not be further repeated here.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION OF EMBODIMENTS

In the following description, specific details such as specific system structures and technologies are proposed for the purpose of illustration rather than limitation, in order to fully understand the embodiments of the present application. However, those skilled in the art should be aware that the present application can also be implemented in other embodiments without these specific details. In other cases, detailed descriptions of well-known systems, devices, circuits, and methods are omitted to avoid unnecessary details hindering the description of the present application.

It should also be understood that the term "and/or" used in the description and the accompanying claims of the present application refers to any combination and all possible combinations of one or more of the related listed items, and includes these combinations.

In addition, in the description of the specification and the accompanying claims of the present application, the terms "first", "second", "third", etc. are only used to distinguish descriptions and cannot be understood as indicating or implying relative importance.

The reference to "an embodiment" or "some embodiments" described in the specification of the present application means that specific features, structures, or features described in conjunction with the embodiment are included in one or more embodiments of the present application. Therefore, the statements "in one embodiment," "in some embodiments," "in other embodiments", "in further other embodiments," and so on that appear differently in the specification do not necessarily refer to the same embodiment, but rather mean "one or more but not all embodiments", unless otherwise specifically emphasized. The terms "including", "comprising", "having", and their variations all mean "including but not limited to", unless otherwise specifically emphasized. "A plurality of, means" two, or "two or more".

Embodiment 1

Figure 1:
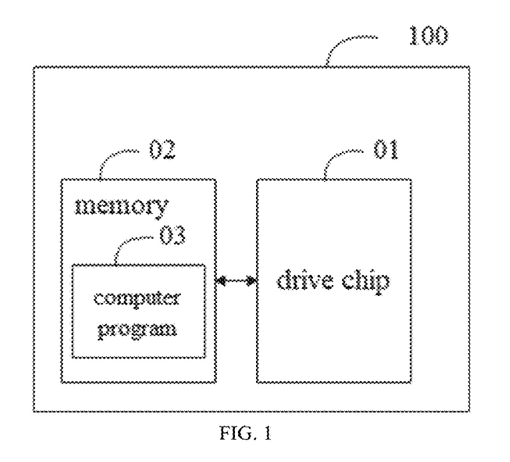
FIG. 1 is a structural diagram of a display panel provided in Embodiment 1 of the present application.

Embodiment 1 of the present application provide a method for removing an afterimage applied to a display panel. FIG. 1 shows a structural diagram of a display panel 100 of the embodiment, the display panel 100 includes a drive chip 01, a memory 02, and a computer program 03 stored in the memory 02 that can be run on the drive chip 01. The drive chip can be DIC (dual in-line ceramic package, drive circuit integrated chip) or TCON (timing controller). The method for removing an afterimage can be executed by the drive chip of the display panel when running the corresponding computer program, so that the terminal device equipped with the OLED display panel can effectively remove the afterimages in the display panel when working, so that the quality of the display panel can be improved and the user's experience can be improved.

It is understood that the afterimage phenomenon is mainly presented in the static picture, there are pixels in same fixed state for a long time, that is, when the pixels of the image are displayed on the screen, there is an uneven difference in light and dark, so that the aging speed of each of the pixels on each screen has a difference, the afterimage phenomenon of the screen is obvious if the following two situations occur: first, there is a stable and unchanged regional light and dark difference in pixels; and second, long maintenance time.

Figure 2:
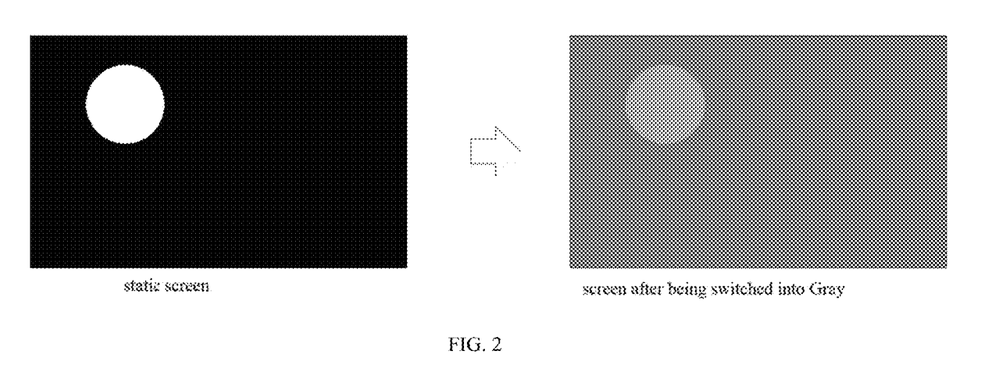
FIG. 2 is ta schematic diagram of an afterimage phenomenon of a conventional OLED display panel provided in an embodiment of the present application.

For example: under a static screen, the black is Gray0, and the white is Gray255, which is maintained for a long time (as shown in the left figure in FIG. 2); when it is necessary to display a whole screen with Gray127 gray scale, then the white area under the static screen will remain the shape of the static screen, that is, this part of the display is brighter than other parts (as shown in the right figure in FIG. 2).

The existing OLED displays, such as mobile phone screens, in practical applications, users use a certain scenario for a long time, such as the current Android/IOS operating system of smart phones, because the system status bar is not changed for a long time, and the system status bar is mainly used to display some icons of conventional information such as power, signal and time, after the device is used for a long time, at this time, if the full screen of the mobile phone is switched to the whole solid-color screen, traces of the power, signal and other icon information may be faintly seen in the position of the status bar. In the embodiment, these icons that may cause the afterimage problem are called blocks; the method for removing the afterimage provided by the present application can intelligently display the target areas that will not change for a long time in the display panel by the drive chip of the display panel when running the corresponding computer program, so as to determine the blocks in the target areas, and then the corresponding pixel transformation processing on these blocks is preformed to solve the problem of removing the afterimage.

For the long-term unchanged area, there will be many cases, in which the area with the color gamut being relatively full color display, and since the display difference between the adjacent pixels is not large, the difference of aging degree of the devices is not large, when the screen is switched, the area not easy to cause afterimage; while the area with display being relatively simple, such as only black and white areas, the display difference between the adjacent pixels is large, the difference of aging degree of the devices is large, which is easy to cause afterimage.

Figure 3:
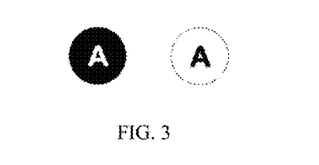
FIG. 3 is a schematic diagram of the routine identification in an unchanged area of a display screen provided in an embodiment of the present application.

For the display of the unchanged area, its purpose is to provide a recognizable identifier, the amount of data contained in the unchanged area has little relationship with the color gamut itself; for example, as shown in FIG. 3, in which there are two types of identifiers, there is basically no difference in the display of these identifiers in the unchanged area.

Figure 4:
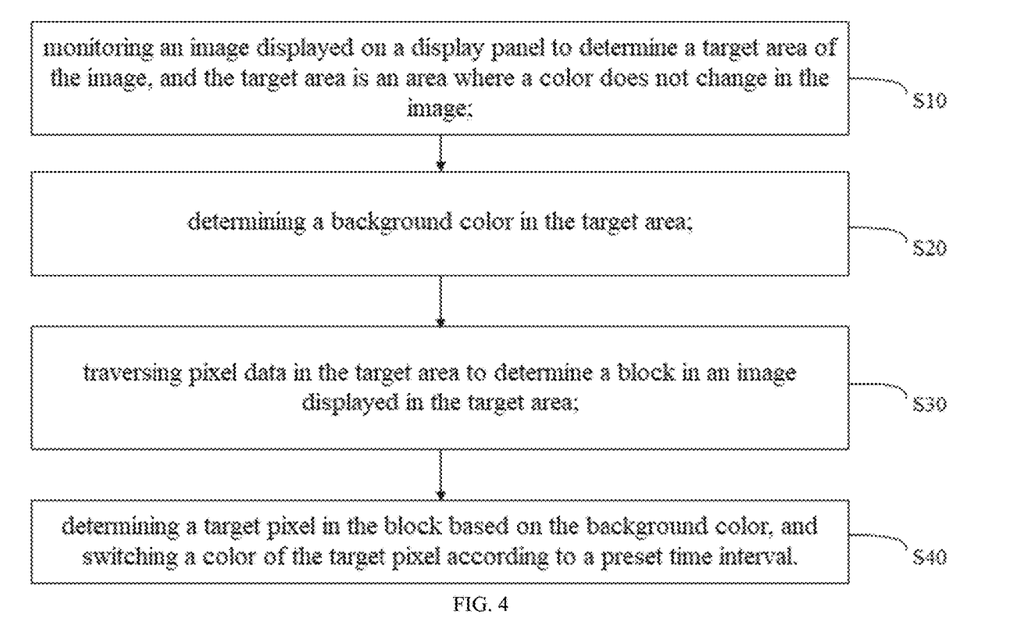
FIG. 4 is a first flowchart of a method for removing an afterimage provided in Embodiment 1 of the present application.

In the application, the terminal device equipped with the OLED display panel can be a mobile terminal device such as a mobile phone or a tablet computer, which can be a desktop computer, can further be a TV; If the display panel of the present application belongs to a display screen configured with a small mobile terminal such as a mobile phone, the drive chip embedded in the display panel can be a DIC; if the display panel of the present application belongs to a large-size display screen such as a TV drama, the drive chip embedded in the display panel can be a TCON. As shown in FIG. 4, the method for removing the afterimage provided in Embodiment 1 of the present application is applied to the display panel and includes steps S10 to S40 as follows:

In step S10, an image displayed on a display panel is monitored to determine a target area of the image, and the target area is an area where a color does not change in the image; then entering the step S20.

In the specific application, the display panel of the embodiment takes the mobile phone screen equipped with the OLED liquid crystal display as an example to be executed, and the execution body of the method for removing the afterimage of the embodiment takes the DIC chip of the display panel as an example. During the bright-screen operation of the mobile phone, the DIC chip will continue to work and monitor the image of the display panel at a set time. In one embodiment, the step S10 includes:

traversing the pixels in the image of the display panel in a first preset period to obtain a first pixel feature scanning result; and traversing the pixels in the image of the display panel in a second preset period to obtain a second pixel feature scanning result. It can be understood that the set time is 180 seconds in total, which is divided into two sections, the first preset period is the first 90 seconds, the second preset period is the last 90 seconds.

comparing the second pixel feature scanning result (the scanning result of the last 90 seconds) with the pixel feature scanning result (the scanning result of the first 90 seconds), determining, if the second pixel feature scanning result is different from the first pixel feature scanning result, that a content of the image of the display panel is changed, and taking an unchanged area in the image of the display panel being as the target area.

Figure 5:
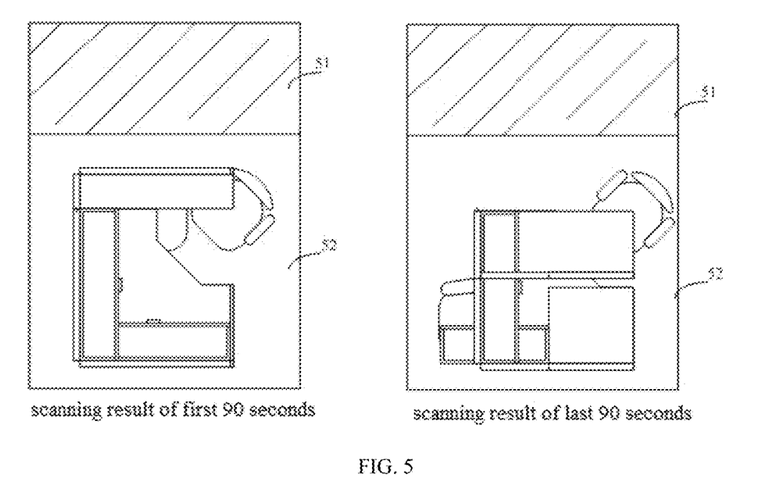
FIG. 5 is a comparison schematic diagram of monitoring results of a content screen of the display panel provided in Embodiment 1 of the present application.

As shown in FIG. 5, the left figure in FIG. 5 is the first pixel feature scanning result (the scanning result of the first 90 seconds), and the right figure in FIG. 5 is is the second pixel feature scanning result (the scanning result of the last 90 seconds). In the two scanning results, the pixel change occurred in the area 52, while the pixel change does not occur in the area 51, then the area 51 without pixel change is taken as the target region, and the area 52 with pixel changes is not processed in this embodiment. In a specific application, for example, the user is watching a video using the mobile phone, the area 52 can be the video playback area, and the area 51 can be the display area of the icons of the status bar at the top of the mobile phone. In the embodiment, only the afterimage phenomenon in the area 51 where the content of the image does not change is processed accordingly, while the area 52 where the content of the image is changed, the embodiment does not do any processing.

In step S20, a background color in the target area is determined.

In the embodiment, the background color is the display color with the largest number of pixel colors in the target area.

Figure 6:
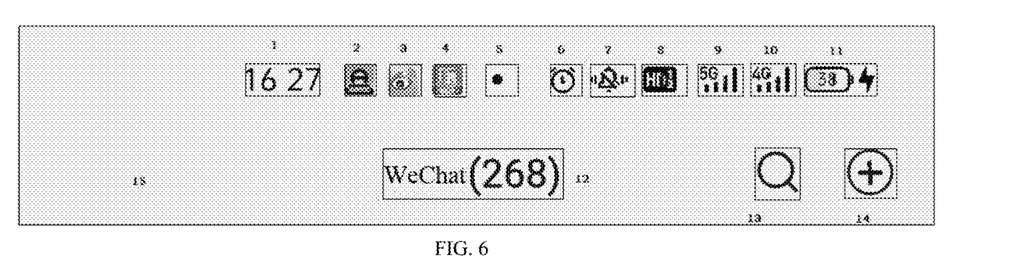
FIG. 6 is a distribution diagram of blocks and background colors in a target area provided in Embodiment 1 of the present application.

In the specific application, the drive chip will record the current displayed color of each pixel in the process of scanning the data of each pixel in the target area, and count the number of color types. FIG. 6, is a schematic diagram of the target area (it should be noted that there is no logical relationship between FIG. 6 and FIG. 5, and it is only used for the explanation of the scheme). As shown in FIG. 6, the display color with the largest number of pixel colors is color 15, then color 15 is the background color.

In Step 30, pixel data in the target area is traversed to determine a block in an image displayed in the target area.

As shown in FIG. 6, 14 types of blocks are provided, and each of the blocks is distinguished by different numbers shown in FIG. 6, and the background color is distinguished by the number 15.

Figure 8:
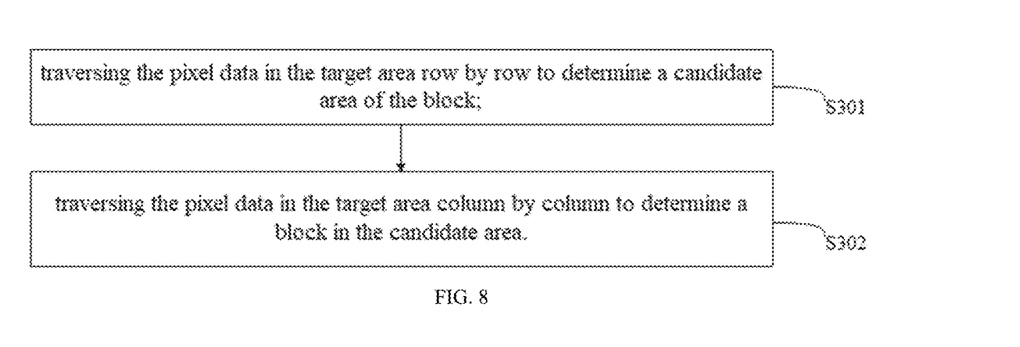
FIG. 8 is a second flowchart of a method for removing an afterimage provided in Embodiment 1 of the present application.

As shown in FIG. 8, in one embodiment, the DIC chip of the display panel will traverse the pixel data corresponding to the image in the display panel row by row and traverse the processing step S30, which includes:

In sub step 301, the pixel data in the target area is traversed row by row to determine a candidate area of the block.

In the specific application, determining an upper boundary of the candidate area of the block when traversing the pixel data in the target area row by row until a first target pixel data with a color being different from the background color is traversed, and the upper boundary is a straight line corresponding to a row direction of the first target pixel data;

determining a lower boundary of the candidate area of the block when colors of a row of all pixel data traversed in the row direction are all the background color.

Figure 7:
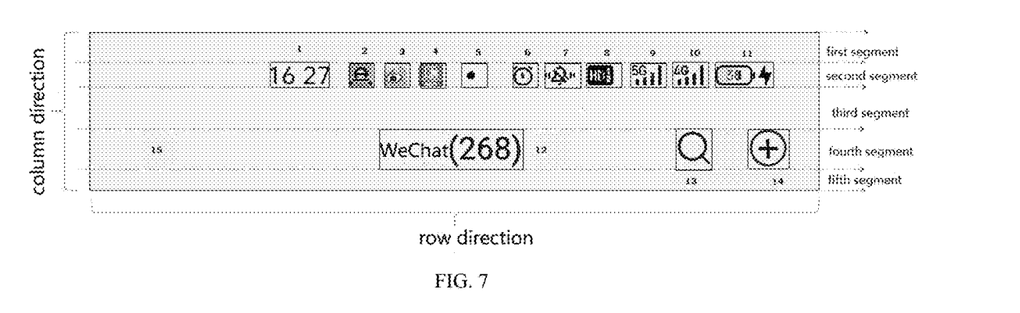
FIG. 7 is a schematic diagram of a drive signal scanning a target area provided in Embodiment 1 of the present application.
Figure 9:
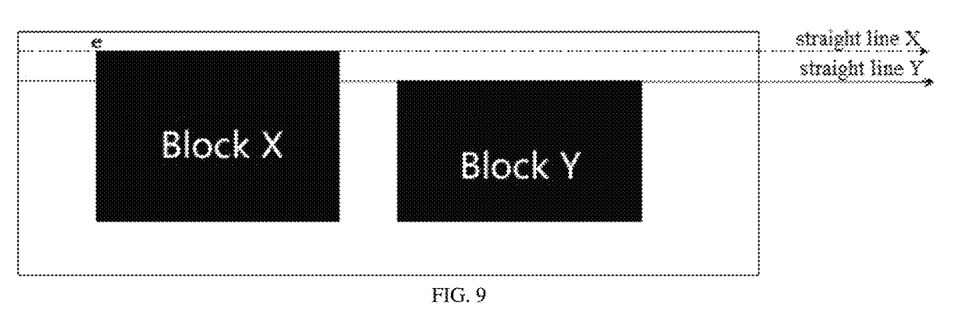
FIG. 9 is a schematic diagram of traversing pixel data in a row direction provided in Embodiment 1 of the present application.

It can be understood that, as shown in FIG. 7, the whole target area is divided into five segments. For example, the second segment (candidate area) in FIG. 7 has 11 blocks, which are traversed row by row from top to bottom. As long as one color in these 11 blocks is different from the background color, the row where the color is located will be taken as the first row of the second segment. As shown in FIG. 9, taking horizontal straight line X and straight line Y as an example, when the straight line X is the first target pixel data (corresponding to pixel point e in FIG. 9) that the color is different from the background color is first traversed, the straight line X will be taken as the first row (upper boundary) of the candidate area instead of the straight line Y (upper boundary).

Figure 10:
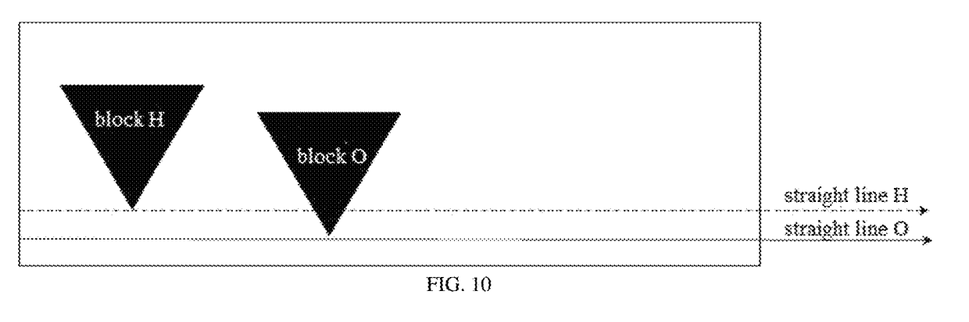
FIG. 10 is an another schematic diagram of traversing pixel data in a row direction provided in Embodiment 1 of the present application.

Similarly, then continued to traverse row by row, as long as the colors of all pixel data in the next row of these 11 blocks are the same as the background color, then this row is the last row of the candidate area; as shown in FIG. 10, taking continuing to traverse block H and block O in the row direction as an example, a straight line H is located on an upper side of a straight line O, and the straight line H and the straight line O are not adjacent lines; if the colors of all pixel data traversed by the straight line O are the same as the background color, the previous line adjacent to the straight line O is used as the last line (lower boundary) of the candidate area, rather than the straight line H as the last line of the candidate area.

In sub step 302, the pixel data in the target area is traversed column by column to determine a block in the candidate area.

In the specific application, determining a left boundary of the candidate area of the block when traversing the pixel data in the target area column by column until a second target pixel data with a color being different from the background color is traversed, and the left boundary is a straight line corresponding to a column direction of the second target pixel data;

determining a right boundary of the candidate area of the block when colors of a column of all pixel data traversed in the column direction are all the background color; and determining the block of the candidate area according to the upper boundary of the candidate area, the lower boundary of the candidate area, the left boundary of the block, and the right boundary of the block, and determining a number of the blocks in the candidate area.

It can be understood that, as shown in FIG. 7, the second segment as shown in FIG. 7 (that is, the upper and lower boundaries of the candidate area) is determined, which has 11 types of blocks, and taking only the first block as example: traversing column by column from left to right until the color of the pixel data being different from the background color is traversed, then the column is the first column of the block; similarly, traversing continued column by column until the colors of a next column of the block are the same as the background color, then the column is the last column of the block; based on the operations above, all of the blocks in FIG. 7 are separated.

It should be noted that the steps S10 to S30 in the embodiment can be performed by the DIC chip of the display panel when the LCD panel is always in the bright state. It can also be that the DIC chip of the LCD panel performs the above steps to process the pixel data in the resting state of the display screen; and finally, the step S40 needs to be performed when the LCD panel is in the bright state so as to prevent the afterimages from appearing in the display panel; in the step S40, determining a target pixel in the block based on the background color, and switching a color of the target pixel according to a preset time interval.

Figure 11:
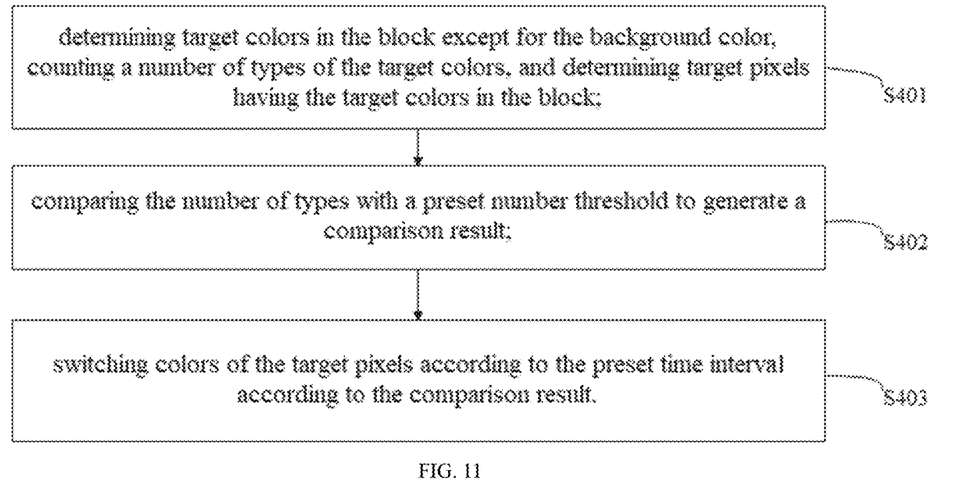
FIG. 11 is a third flowchart of a method for removing an afterimage provided in Embodiment 1 of the present application.

It can be understood that after distinguishing each block in the target area, the afterimage phenomenon caused by a single block needs to be removed; however, for different types of blocks the corresponding technical means to remove the afterimage are different:

In one embodiment, as shown in FIG. 11, the step S40 includes:

In sub step S401, target colors in the block except for the background color are determined, counting a number of types of the target colors, and determining target pixels having the target colors in the block;

In sub step S402, the number of types is compared with a preset number threshold to generate a comparison result; and In sub step S403, colors of the target pixels are switched according to the preset time interval according to the comparison result.

The beneficial effect of the embodiment of the present application is that it can prevent the afterimage phenomenon in the display panel, and it can also remove the afterimages after the afterimages appear in the screen of the display panel. For example, when the LCD panel is always in the bright state, the DIC chip of the display panel executes the above method steps, which can effectively remove the afterimages that have appeared in the image of the display panel; or, when the working condition of the LCD panel continuously switches between the bright state and the resting state (for example, the user lights up the mobile phone screen and then turns off the display screen, and then lights up the mobile phone screen again), the DIC chip of the display panel executes the above method steps S10-S30 to process the pixel data during in the resting state, and executes the step S40 when the LCD panel is in the bright state to prevent or remove the existing afterimages on the LCD panel.

In one embodiment, before performing the sub step S402, it is necessary to determine whether the color of the currently processed pixel data is the background color, if yes, step S41 is performed; if no (that is, the color of the currently processed pixel data is the target color), steps S402 to S403 are performed.

The step S41 includes: determining a background pixel having the background color in the target area; and switching a color of the background pixel between the background color and a preset color according to the preset time interval.

It is understood that for the background color in the target area, it needs to be changed, a preset color ranged from Gray0 to Gray255 (to ensure the RGB proportion within the pixel) is selected, and the preset color needs to be different from the background color, and the color of the background pixel is switched between the background color and the preset color according to the preset time interval T (T is adjustable).

For target colors in the target area other than the background color, the sub step S402 is needed to be performed to compare the number of types of target colors in the target area with a preset number threshold, and finally, the sub step S403 is performed to remove the afterimages in the display panel according to the comparison result.

Figure 12:
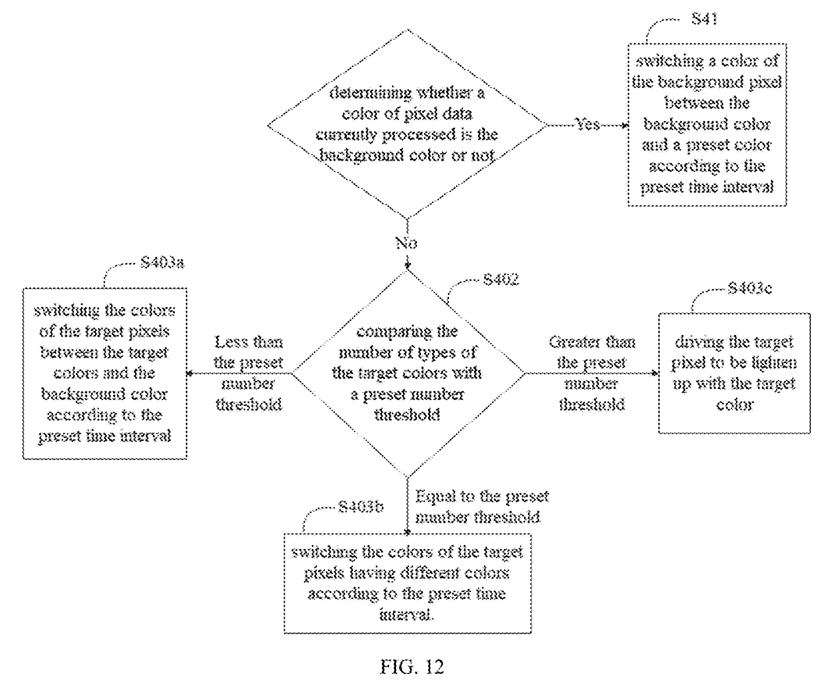
FIG. 12 is a fourth flowchart of a method for removing an afterimage provided in Embodiment 1 of the present application.

In the specific application, the preset number threshold of the embodiment is set to be 2, as shown in FIG. 12. The afterimage conditions of the blocks in the embodiment can be divided into three conditions, and the methods for removing the afterimage used are different according to the different afterimage conditions:

The first condition is that: determining the block being a block displaying a narrow color gamut if the number of types is less than the preset number threshold, then sub step S403a is performed: switching the colors of the target pixels between the target colors and the background color according to the preset time interval.

It can be understood that for a block with only one color (excluding the background color), as shown in FIG. 6, block 1, block 5, block 6, block 7, block 8, block 9, block 10, block 12, block 13, and block 14 contain basically only black, then the colors of the target pixel is needed to be switched between the target color (black) and the background color according to the preset time interval. That is, the colors of these blocks (block 1, block 5, block 6, block 7, block 8, block 9, block 10, block 12, block 13, and block 14) and the background color are changed once according to the preset time interval T (T is adjustable), for example, the first ten minutes to display black, the last 10 minutes to display the background color, and then 10 minutes to black, and then the corresponding afterimage phenomenon can be removed.

The second condition is that: determining the block being still a block displaying a narrow color gamut if the number of types is equal to the preset number threshold, then sub step S403b is performed: switching the colors of the target pixels having different colors according to the preset time interval.

It can be understood that for the block with two colors (excluding the background color), such as the block 11 in FIG. 6, for example, if there are two colors in the block 11, then colors of the target pixel showing black and the target pixel showing yellow need to be switched, and the color switching needs to be performed every time interval T (T is adjustable), so as to remove the corresponding afterimage phenomenon.

The third condition is that: determining the block being a block displaying a wide color gamut if the number of types is greater than the preset number threshold, then sub step S403c is performed: driving the target pixel to be lighten up with the target color.

It can be understood that the parts of the blocks that do not need to change the display are excluded, such as the block 2, block 3 and block 4 shown in FIG. 6 belong to blocks with a wide color gamut.

Since the difference between the adjacent pixels of the block is less, and the probability of afterimage phenomenon is very small in the position adjacent to the background color. The background color itself will change as in step S41, so this block does not need to be changed. Therefore, the block with main display colors being more than two (excluding the background color) does not need to be changed.

The beneficial effect of the embodiment is that: the method for removing the afterimage provided in the embodiment can identify the long-term unchanged display area (the target area) of the display panel, and distinguish from the target area that which pixel displays the color is the background color or other colors (the target color); and the method can automatically identify different blocks in the target area (such as icons used to display power, signal or time). For blocks with a wide color gamut, the color displayed by the pixels in these blocks remains unchanged. For the blocks with a narrow color gamut, the colors between the target pixels with different colors in the block are switched according to the preset time interval, which can effectively prevent the afterimage phenomenon in the display panel when the terminal device equipped with the OLED display panel is working, and the afterimages can also be removed after the afterimages appear in the display panel. The quality of the display panel is improved and the experience of the user is improved.

It should be understood that the sequence number of the steps in the above embodiments does not imply the order of execution, and that the order of execution of each process shall be determined by its function and internal logic, and shall not constitute any limitation on the implementation process of the embodiments of the present application.

Embodiment 2

The Embodiment 2 of the present application provides a device for removing an afterimage, which is used for performing the method for removing an afterimage in Embodiment 1. The device can be a virtual appliance in the display panel, run by the drive chip of the display panel, or it can be the display panel itself.

Figure 13:
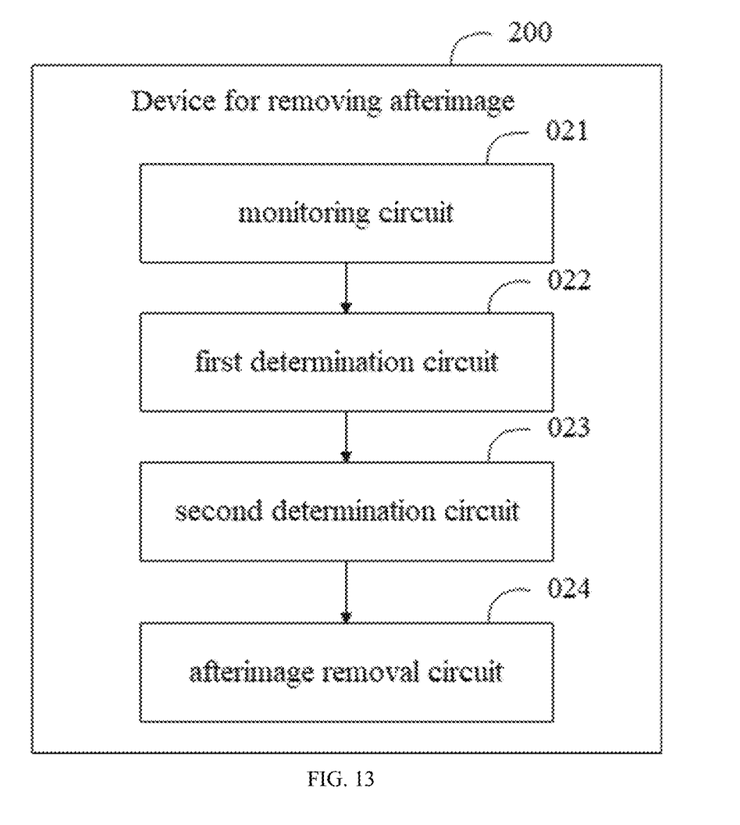
FIG. 13 is a block diagram of a device for removing an afterimage provided in Embodiment 2 of the present application.

As shown in FIG. 13, the device 200 provided in Embodiment 2 of the present application includes:
- a monitoring circuit 021, configured for monitoring an image displayed on a display panel to determine a target area of the image, wherein the target area is an area where a color does not change in the image;
- a first determination circuit 022, configured for determining a background color in the target area;
- a second determination circuit 023, configured for traversing pixel data in the target area to determine a block in an image displayed in the target area; and
- an afterimage removal circuit 024, configured for determining a target pixel in the block based on the background color, and switching a color of the target pixel according to a preset time interval.

In one embodiment, the afterimage removal circuit 024 also includes:

a statistical sub-circuit, configured for determining target colors in the block except for the background color, counting a number of types of the target colors, and determining target pixels having the target colors in the block;

a comparison sub-circuit, configured for comparing the number of types with a preset number threshold to generate a comparison result; and a switching sub-circuit, configured for switching colors of the target pixels according to the preset time interval according to the comparison result.

In the application, the circuits in the device for removing the afterimage can be software program units, or they can be realized by different logic circuits integrated in the drive circuit integrated chip or independent physical components connected to the drive chip.

It should be noted that the information interaction and execution process between the above devices/circuits are based on the same idea as the embodiments of the method of the present application, and their specific functions and technical effects can be specifically referred to the embodiments of the method, which will not be repeated here.

It can be clearly understood by the those skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the above embodiments, the description of each embodiment has its own emphasis, and the parts that are not detailed or documented in an embodiment can be referred to the relevant descriptions of other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The modules described as separate components could or could not be physically separate, and the components displayed as modules could or could not be physical modules, which can be located in one place, or can be distributed to multiple network elements. Parts or all of the elements could be selected according to the actual needs to achieve the object of the present embodiment.

The above embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for removing an afterimage, comprising:
monitoring an image displayed on a display panel to determine a target area of the image, wherein the target area is an area where a color does not change in the image;
determining a background color in the target area;
traversing pixel data in the target area to determine a block in an image displayed in the target area; and
determining a target pixel in the block based on the background color, and switching a color of the target pixel according to a preset time interval;
wherein the step of determining the target pixel in the block based on the background color, and switching the color of the target pixel according to the preset time interval comprises:
determining target colors in the block except for the background color, counting a number of types of the target colors, and determining target pixels having the target colors in the block;
comparing the number of types with a preset number threshold to generate a comparison result; and
switching colors of the target pixels according to the preset time interval according to the comparison result.

2. The method according to claim 1, wherein the step of switching the colors of the target pixels according to the preset time interval according to the comparison result comprises:
switching, if the number of types is less than the preset number threshold, the colors of the target pixels between the target colors and the background color according to the preset time interval.

3. The method according to claim 1, wherein the step of switching the colors of the target pixels according to the preset time interval according to the comparison result comprises:
switching, if the number of types is equal to the preset number threshold, the colors of the target pixels having different colors according to the preset time interval.

4. The method according to claim 1, wherein further comprises:
determining a background pixel having the background color in the target area; and
switching a color of the background pixel between the background color and a preset color according to the preset time interval.

5. The method according to claim 4, wherein after the step of comparing the number of types with a preset number threshold to generate the comparison result further comprises:
driving, if the number of types of target colors in the block is greater than the preset number threshold, the target pixel to be lighten up with the target color.

6. The method according to claim 1, wherein the step of traversing the pixel data in the target area to determine the block in the image displayed in the target area comprises:
traversing the pixel data in the target area row by row to determine a candidate area of the block; and
traversing the pixel data in the target area column by column to determine a block in the candidate area.

7. The method according to claim 2, wherein the step of traversing the pixel data in the target area to determine the block in the image displayed in the target area comprises:
traversing the pixel data in the target area row by row to determine a candidate area of the block; and
traversing the pixel data in the target area column by column to determine a block in the candidate area.

8. The method according to claim 3, wherein the step of traversing the pixel data in the target area to determine the block in the image displayed in the target area comprises:
traversing the pixel data in the target area row by row to determine a candidate area of the block; and
traversing the pixel data in the target area column by column to determine a block in the candidate area.

9. The method according to claim 4, wherein the step of traversing the pixel data in the target area to determine the block in the image displayed in the target area comprises:
traversing the pixel data in the target area row by row to determine a candidate area of the block; and
traversing the pixel data in the target area column by column to determine a block in the candidate area.

10. The method according to claim 5, wherein the step of traversing the pixel data in the target area to determine the block in the image displayed in the target area comprises:
traversing the pixel data in the target area row by row to determine a candidate area of the block; and
traversing the pixel data in the target area column by column to determine a block in the candidate area.

11. The method according to claim 6, wherein the step of traversing the pixel data in the target area row by row to determine the candidate area of the block comprises:
determining an upper boundary of the candidate area of the block when traversing the pixel data in the target area row by row until a first target pixel data with a color being different from the background color is traversed, wherein the upper boundary is a straight line corresponding to a row direction of the first target pixel data; and
determining a lower boundary of the candidate area of the block when colors of a row of all pixel data traversed in the row direction are all the background color;
the step of traversing the pixel data in the target area column by column to determine the block in the candidate area comprises:
determining a left boundary of the candidate area of the block when traversing the pixel data in the target area column by column until a second target pixel data with a color being different from the background color is traversed, wherein the left boundary is a straight line corresponding to a column direction of the second target pixel data;
determining a right boundary of the candidate area of the block when colors of a column of all pixel data traversed in the column direction are all the background color; and
determining the block of the candidate area according to the upper boundary of the candidate area, the lower boundary of the candidate area, the left boundary of the block, and the right boundary of the block.

12. The method according to claim 7, wherein the step of traversing the pixel data in the target area row by row to determine the candidate area of the block comprises:
determining an upper boundary of the candidate area of the block when traversing the pixel data in the target area row by row until a first target pixel data with a color being different from the background color is traversed, wherein the upper boundary is a straight line corresponding to a row direction of the first target pixel data; and
determining a lower boundary of the candidate area of the block when colors of a row of all pixel data traversed in the row direction are all the background color;
the step of traversing the pixel data in the target area column by column to determine the block in the candidate area comprises:
determining a left boundary of the candidate area of the block when traversing the pixel data in the target area column by column until a second target pixel data with a color being different from the background color is traversed, wherein the left boundary is a straight line corresponding to a column direction of the second target pixel data;
determining a right boundary of the candidate area of the block when colors of a column of all pixel data traversed in the column direction are all the background color; and
determining the block of the candidate area according to the upper boundary of the candidate area, the lower boundary of the candidate area, the left boundary of the block, and the right boundary of the block.

13. The method according to claim 8, wherein the step of traversing the pixel data in the target area row by row to determine the candidate area of the block comprises:
determining an upper boundary of the candidate area of the block when traversing the pixel data in the target area row by row until a first target pixel data with a color being different from the background color is traversed, wherein the upper boundary is a straight line corresponding to a row direction of the first target pixel data; and
determining a lower boundary of the candidate area of the block when colors of a row of all pixel data traversed in the row direction are all the background color;
the step of traversing the pixel data in the target area column by column to determine the block in the candidate area comprises:
determining a left boundary of the candidate area of the block when traversing the pixel data in the target area column by column until a second target pixel data with a color being different from the background color is traversed, wherein the left boundary is a straight line corresponding to a column direction of the second target pixel data;

determining a right boundary of the candidate area of the block when colors of a column of all pixel data traversed in the column direction are all the background color; and determining the block of the candidate area according to the upper boundary of the candidate area, the lower boundary of the candidate area, the left boundary of the block, and the right boundary of the block.

14. The method according to claim 9, wherein the step of traversing the pixel data in the target area row by row to determine the candidate area of the block comprises:

determining an upper boundary of the candidate area of the block when traversing the pixel data in the target area row by row until a first target pixel data with a color being different from the background color is traversed, wherein the upper boundary is a straight line corresponding to a row direction of the first target pixel data; and determining a lower boundary of the candidate area of the block when colors of a row of all pixel data traversed in the row direction are all the background color;

the step of traversing the pixel data in the target area column by column to determine the block in the candidate area comprises:

determining a left boundary of the candidate area of the block when traversing the pixel data in the target area column by column until a second target pixel data with a color being different from the background color is traversed, wherein the left boundary is a straight line corresponding to a column direction of the second target pixel data;

determining a right boundary of the candidate area of the block when colors of a column of all pixel data traversed in the column direction are all the background color; and determining the block of the candidate area according to the upper boundary of the candidate area, the lower boundary of the candidate area, the left boundary of the block, and the right boundary of the block.

15. The method according to claim 10, wherein the step of traversing the pixel data in the target area row by row to determine the candidate area of the block comprises:

determining an upper boundary of the candidate area of the block when traversing the pixel data in the target area row by row until a first target pixel data with a color being different from the background color is traversed, wherein the upper boundary is a straight line corresponding to a row direction of the first target pixel data; and determining a lower boundary of the candidate area of the block when colors of a row of all pixel data traversed in the row direction are all the background color;

the step of traversing the pixel data in the target area column by column to determine the block in the candidate area comprises:

determining a left boundary of the candidate area of the block when traversing the pixel data in the target area column by column until a second target pixel data with a color being different from the background color is traversed, wherein the left boundary is a straight line corresponding to a column direction of the second target pixel data;

determining a right boundary of the candidate area of the block when colors of a column of all pixel data traversed in the column direction are all the background color; and determining the block of the candidate area according to the upper boundary of the candidate area, the lower boundary of the candidate area, the left boundary of the block, and the right boundary of the block.

16. A device for removing an afterimage, comprising:

a monitoring circuit, configured for monitoring an image displayed on a display panel to determine a target area of the image, wherein the target area is an area where a color does not change in the image;

a first determination circuit, configured for determining a background color in the target area;

a second determination circuit, configured for traversing pixel data in the target area to determine a block in an image displayed in the target area; and an afterimage removal circuit, configured for determining a target pixel in the block based on the background color, and switching a color of the target pixel according to a preset time interval;

wherein afterimage removal circuit is specifically configured for determining target colors in the block except for the background color, counting a number of types of the target colors, and determining target pixels having the target colors in the block; comparing the number of types with a preset number threshold to generate a comparison result; and switching colors of the target pixels according to the preset time interval according to the comparison result.

17. A display panel, comprising a memory, a processor chip, and a computer program stored in the memory and capable of running on the processor chip, wherein the computer program is executed to implement steps:

monitoring an image displayed on a display panel to determine a target area of the image, wherein the target area is an area where a color does not change in the image;

determining a background color in the target area;

traversing pixel data in the target area to determine a block in an image displayed in the target area; and determining a target pixel in the block based on the background color, and switching a color of the target pixel according to a preset time interval;

wherein the step of determining the target pixel in the block based on the background color, and switching the color of the target pixel according to the preset time interval comprises:

determining target colors in the block except for the background color, counting a number of types of the target colors, and determining target pixels having the target colors in the block;

comparing the number of types with a preset number threshold to generate a comparison result; and switching colors of the target pixels according to the preset time interval according to the comparison result.

* * * * *